United States Patent
Isshiki

(10) Patent No.: US 7,286,819 B2
(45) Date of Patent: Oct. 23, 2007

(54) PRINTING APPARATUS, PRINT CONTROL METHOD, AND PROGRAM PRODUCT

(75) Inventor: Naohiro Isshiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 10/688,961

(22) Filed: Oct. 21, 2003

(65) Prior Publication Data

US 2004/0085567 A1    May 6, 2004

(30) Foreign Application Priority Data

Oct. 31, 2002   (JP)   ............................. 2002-318430
Aug. 25, 2003   (JP)   ............................. 2003-208559

(51) Int. Cl.
*H04Q 7/22*   (2006.01)
*H04Q 7/38*   (2006.01)
*H04M 1/00*   (2006.01)

(52) U.S. Cl. ............................. 455/414.4; 455/556.1; 455/557; 358/1.15; 358/3.26; 358/530; 382/100; 382/180

(58) Field of Classification Search ............... 455/563, 455/557, 550.1, 556.1, 566, 575.6, 414.4; 358/1.9, 1.11–1.18, 1.15–1.66; 382/100; 348/32, 207
See application file for complete search history

(56) References Cited

U.S. PATENT DOCUMENTS

| | | | | |
|---|---|---|---|---|
| 5,835,122 A | | 11/1998 | Oki et al. | 347/251 |
| 5,875,044 A | * | 2/1999 | Seto et al. | 358/518 |
| 5,881,168 A | * | 3/1999 | Takaoka et al. | 382/180 |
| 6,028,676 A | | 2/2000 | Nakao | 358/1.16 |
| 6,567,180 B1 | * | 5/2003 | Kageyama et al. | 358/1.15 |
| 6,674,538 B2 | * | 1/2004 | Takahashi | 358/1.15 |
| 6,819,442 B2 | * | 11/2004 | Takahashi | 358/1.15 |
| 6,873,711 B1 | * | 3/2005 | Murakami et al. | 382/100 |
| 6,900,911 B1 | * | 5/2005 | Yamazaki | 358/3.26 |
| 2001/0008417 A1 | * | 7/2001 | Kinjo | 348/207 |
| 2001/0040684 A1 | * | 11/2001 | Takahashi | 358/1.2 |

FOREIGN PATENT DOCUMENTS

JP   7-137355   5/1995
JP   11-4347    1/1999

* cited by examiner

*Primary Examiner*—Tony T. Nguyen
(74) *Attorney, Agent, or Firm*—Fitzpatrick, Cella, Harper & Scinto

(57) ABSTRACT

To improve usability by prevent a print output which is not desired by the user from being outputted, for example, whether an image is outputted when a deterioration state exceeds a specific deterioration degree or not is set by an operation panel 1012, and when raster image information which is deteriorated and formed in accordance with inputted print information is printed, the printing is stopped in accordance with the setting.

37 Claims, 8 Drawing Sheets

FIG. 8

STORING MEDIUM SUCH AS FD/CD-ROM, ETC

| DIRECTORY INFORMATION |
|---|
| 1ST DATA PROCESSING PROGRAM<br>PROGRAM CODE GROUP CORRESPONDING TO STEPS IN FLOWCHART SHOWN IN FIG. 4 |
| 2ND DATA PROCESSING PROGRAM<br>PROGRAM CODE GROUP CORRESPONDING TO STEPS IN FLOWCHART SHOWN IN FIG. 5 |
| 3RD DATA PROCESSING PROGRAM<br>PROGRAM CODE GROUP CORRESPONDING TO STEPS IN FLOWCHART SHOWN IN FIG. 6 |
|  |

MEMORY MAP IN STORING MEDIUM

PRINTING APPARATUS, PRINT CONTROL METHOD, AND PROGRAM PRODUCT

BACKGROUND OF THE INVENTION

1. Field of the Invention

The invention relates to control of a printing apparatus for receiving print information from a plurality of computers on a network via a predetermined interface and processing it.

2. Related Background Art

In recent years, an information processing system in which a color printing apparatus and a plurality of host computers can communicate with each other has been generalized and widely used. In such a situation, many electronic documents are formed on the information processing system, there is a tendency such that an output request to the color printing apparatus is increasing, and a high-speed color printing apparatus of a low cost is demanded.

Hitherto, in a print system for interpreting a page description language (PDL) transmitted from a host computer or a print server and forming a raster image, generally, the PDL is interpreted, thereafter, a display list (DL) as an intermediate language is formed, and raster image conversion (rendering) from the DL is executed.

At this time, since a size of the PDL data is not limited, there is a case where a size of DL which is formed from the PDL data is very large. If the DL is complicated and its size increases, a work area which is used by a renderer for rendering the DL also increases.

However, since an amount of memory which is provided in the printing apparatus is limited and there is a limitation of costs, in many cases, there is not an enough amount to store the DL.

Therefore, a size of area to store the DL and a size of work area which can be used by the renderer are limited and there is a limitation such that a DL of a predetermined size or more cannot be processed.

A process called a fallback is executed to avoid such a limitation. According to the fallback, when the size of DL exceeds the predetermined size or if it is known that the size of work area for processing the DL exceeds the predetermined size, the DL formed once so far is rendered so as to form a raster image and the DL formed so far is cleared once.

The raster image is added again as a background image of a drawing area to a part of the DL.

Ordinarily, since the background image is compressed, a size of DL which is added is smaller than the original DL size. Therefore, by forming the residual DL into the empty area, the DL of a large size can be processed in the limited memory space. Since the work area of the renderer is also cleared when the rendering at the time of the fallback is finished, the size limitation of the work area can be also avoided and the printing apparatus of a low cost can be provided.

Although the raster image formed in the step of executing the fallback process as mentioned above is compressed and added to a DL list, the compression image which is formed at this time has to be also enclosed in the predetermined size.

Particularly, since the size of raster image which is formed upon rendering in the case of a color image is very large and, in many cases, the compression image cannot be enclosed in the predetermined size in the case of reversible compression, irreversible compression is ordinarily used.

However, if the irreversible compression is used, a compressed image deteriorates. As a method of minimizing such image deterioration, while sequentially changing a compression ratio from a low compression ratio to a high compression ratio (from the compression of small image deterioration to the compression of large image deterioration), the rendered image is compressed a plurality of number of times until the compression image is enclosed into the predetermined size. By using such a method, the image is compressed at the minimum compression ratio at which it is enclosed into the predetermined size and the image deterioration is minimized. For example, refer to JP-A-H7-137355 (U.S. Pat. No. 5,835,122).

However, the compression ratio of the raster image depends on the contents of the raster image and there is a case where the compression ratio fairly deteriorates even in the compression in which image deterioration of a similar degree occurs.

In the case of such a raster image, the compression which causes large image deterioration has to be executed in order to enclose the image into the predetermined size. Picture quality of the compression image deteriorates fairly. In many cases, there is a problem such that a print output including such a deteriorated compression image is different from a desired output of the user.

SUMMARY OF THE INVENTION

The invention is made to solve the above problems and it is an object of the invention to provide a printing apparatus for compressing raster image information which is formed in accordance with print information which is inputted and holding it into an internal memory, wherein a threshold value to discriminate a deterioration state of the raster image information upon compression is designated and whether the image deterioration state of the compressed raster image information exceeds the designated threshold value or not is discriminated, thereby enabling the user to select whether a print output including the compression image of large image deterioration as mentioned above is printed or not, so that the print output which is not desired by the user is not outputted and usability can be improved.

A printing apparatus of the invention to accomplish the above object comprises: a setting unit for setting whether printing is executed in excess of a specific deterioration degree or not; and a printing unit for executing the printing on the basis of print information in accordance with the setting by the setting unit when an image is deteriorated and printed on the basis of the print information.

BRIEF DESCRIPTION OF THE DRAWINGS

FIG. 8 is a diagram for explaining a memory map of a storing medium for storing various data processing programs which can be read out by the printing apparatus according to the invention.

DETAILED DESCRIPTION OF THE PREFERRED EMBODIMENTS

Prior to explaining a construction of an embodiment, a construction of a laser beam printer which is suitable for applying the embodiment thereto will be described with reference to FIG. 1. Naturally, a printer to which the embodiment is applied is not limited to the laser beam printer but it can be also embodied to a printer (ink jet printer) of another print system.

Figure 1:
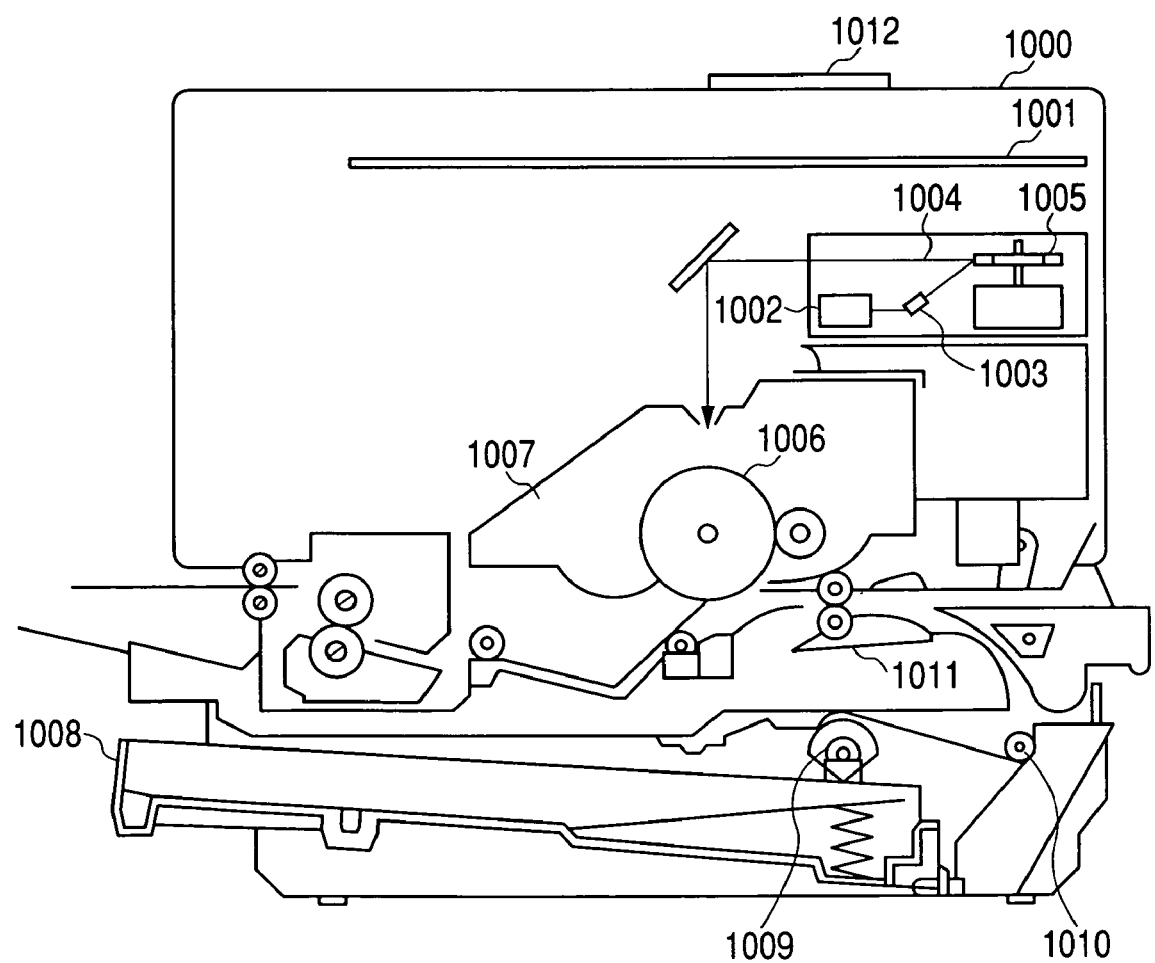
FIG. 1 is a cross sectional view showing a construction of an output apparatus to which the invention can be applied.

FIG. 1 is a cross sectional view showing a construction of an output apparatus to which the invention can be applied and shows a case of, for example, a laser beam printer (LBP).

In FIG. 1, reference numeral 1000 denotes an LBP main body (LBP) which inputs and stores print information (character codes, etc.), form information, a macro command, and the like which are supplied from an external information source such as a host computer or the like connected to an outside via a network or connected by a direct interface, forms a corresponding character pattern, form pattern, or the like in accordance with those information, and forms an image onto recording paper or the like as a recording medium.

Reference numeral 1012 denotes an operation panel on which switches for operation, an LED display, and the like are arranged. Reference numeral 1001 denotes a printer control unit for controlling the whole LBP 1000 and analyzing character information or the like which is supplied from an external network or the like.

The printer control unit 1001 converts mainly the character information into a video signal of the corresponding character pattern and outputs it to a laser driver 1002. The laser driver 1002 is a circuit for driving a semiconductor laser 1003 and switching an on/off operation of a laser beam 1004 which is emitted from the semiconductor laser 1003 in accordance with the inputted video signal. The laser beam 1004 is swung to the right and left by a rotary polygon mirror 1005 and scans and exposes an electrostatic drum 1006.

Thus, an electrostatic latent image of the character pattern is formed on the electrostatic drum 1006. The latent image is developed by a developing unit 1007 arranged around the electrostatic drum 1006 and, thereafter, transferred onto the recording paper.

A cut sheet is used as recording paper. The cut sheet recording paper is enclosed in a sheet cassette 1008 attached to the LBP 1000, fed into the apparatus by a paper feed roller 1009, a conveying roller 1010, and a conveying roller 1011, and supplied to the electrostatic drum 1006.

(First Embodiment)

Figure 2:
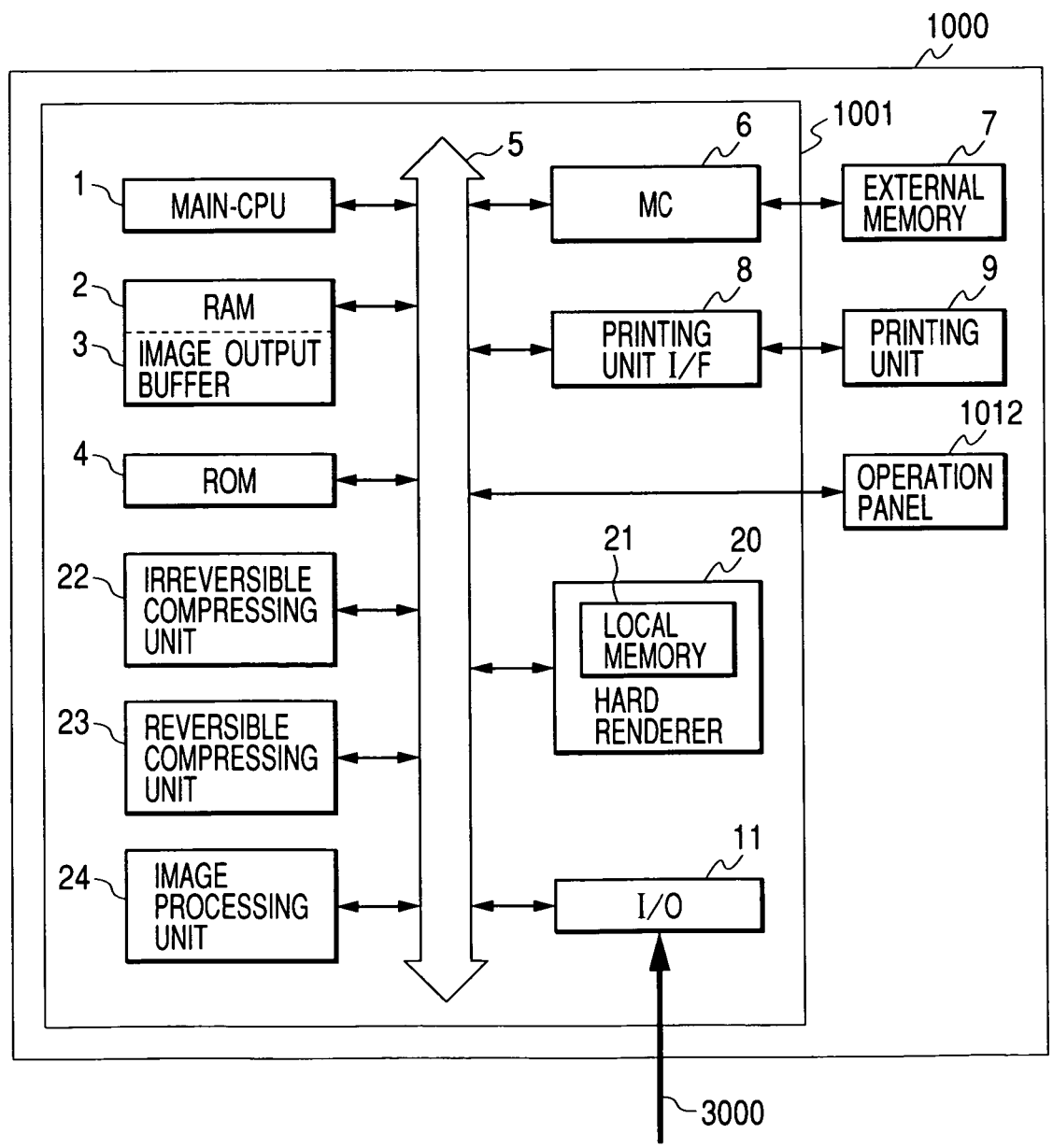
FIG. 2 is a block diagram for explaining a construction of a printer control system in a printing apparatus according to the first embodiment of the invention.

FIG. 2 is a block diagram for explaining a construction of a printer control system in a printing apparatus according to the first embodiment of the invention. In FIG. 2, the same component elements as those in FIG. 1 are designated by the same reference numerals.

In the printer control unit 1001 shown in FIG. 2, a main-CPU 1 is a CPU of the printer. The main-CPU 1 integratedly controls accesses to various devices which are connected to a system bus 5 on the basis of a control program stored in a ROM 4, a control program stored in an external memory 7, or the like and outputs an image signal as output information to a printing unit (printer engine) 9 connected via a printing unit interface 8.

The control programs for the main-CPU 1 as shown in flowcharts of FIGS. 4 and 5, which will be explained herein later and data necessary for control of the LBP 1000 are stored in the ROM 4. The main-CPU 1 can communicate with an external apparatus such as a host computer or the like connected to an external network 3000 via an I/O 11.

Although the main-CPU 1 communicates with the host computer via the external network, naturally, it is possible to connect the main-CPU 1 to the host computer via the direct interface (not shown) and communicate.

Reference numeral 2 denotes a RAM which functions as a main memory, a work area, etc. of the main-CPU 1. The RAM 2 is constructed so that a memory capacity can be expanded by an option RAM which is connected to an expansion port (not shown).

Reference numeral 3 denotes an image output buffer which is prepared on the RAM 2. A raster image and attribute bits which are formed by a hard renderer 20, which will be explained hereinlater, are recorded into the image output buffer 3 as a fallback buffer or an output buffer.

Reference numeral 6 denotes a memory controller (MC) for controlling an access to an external memory 7 such as a hard disk or the like. Reference numeral 20 denotes the hard renderer having a local memory 21 therein. The hard renderer 20 interprets a display list (DL) transferred to the local memory 21 or a DL in the RAM 2 as it is and forms the raster image and the corresponding attribute bits of each pixel of the raster image.

Each attribute bit which is formed here is constructed by three bit fields of total of four bits comprising: a color bit of one bit; a thin line bit of 1 bit; and object type bits of 2 bits.

The color bit shows whether the corresponding pixel is a pixel constructing a color object or a pixel constructing a black and white object. When the color bit is equal to "0", the pixel is a pixel constructing the color object. When it is equal to "1", the pixel is a pixel constructing the black and white object.

The thin line bit shows whether the corresponding pixel is a pixel constructing a thin line or not. When the thin line bit is equal to "1", the pixel is a pixel constructing the thin line.

The object type bits show which type of drawing object the corresponding pixel constructs. When the object type bits are equal to "01", the pixel is a pixel constructing a character object. When they are equal to "10", the pixel is a pixel constructing a graphics object. When they are equal to "11", the pixel is a pixel constructing an image object. When they are equal to "00", it means that the pixel does not construct any object.

An irreversible compressing unit 22 executes irreversible compression to the raster image and stores the compressed image into the image output buffer 3 on the RAM 2. The irreversible compressing unit according to the embodiment uses JPEG. According to JPEG, by changing a Q table which is used upon compression, a compression ratio of an image as a compression target. The higher the compression ratio is, the larger the image deterioration is.

Although JPEG is used as irreversible compression, naturally, the invention can be applied to any irreversible compressing method so long as the compression ratio can be changed.

A reversible compressing unit 23 executes reversible compression to the attribute bit and stores the compressed image into the image output buffer 3. An image processing unit 24 executes one of an image process for characters, an image process for an image, an image process for graphics, an image process for a black and white image, and an image process for a thin line or a combination of them to the raster data on the basis of the attribute bit formed by the hard renderer 20.

In the printer control system constructed as mentioned above, embodiments of the invention will be described with reference to FIG. 3 and flowcharts of FIGS. 4 to 6.

The LBP 1000 has, for example, six kinds of Q tables which are set into JPEG of the irreversible compressing unit 22 when the raster image which is formed upon rendering, which will be explained hereinlater, is compressed. The Q tables have identifiers 1 to 6. Those identifiers are called Q table IDs for convenience of explanation. Each Q table has been set so that the larger the Q table ID is, the higher the compression ratio is. Therefore, if the Q table having the larger Q table ID is used, the image deterioration increases more.

Although there are six kinds of Q tables here, naturally, the number of Q tables is not limited. In the embodiment, compression results which are obtained by using the Q tables of the Q table ID1 to the Q table ID5 show that the image deterioration is inconspicuous at a glance. However, the Q table of the Q table ID6 has been designed so that compression results of most images can be enclosed in a fallback buffer or an image spool area, which will be explained hereinlater, and the image deterioration which is caused when such a Q table is used is very large.

The system of the embodiment has a user interface by which the user can select whether the output of the image including the compression image obtained by using the Q table of the Q table ID6 is permitted or inhibited.

Figure 3:
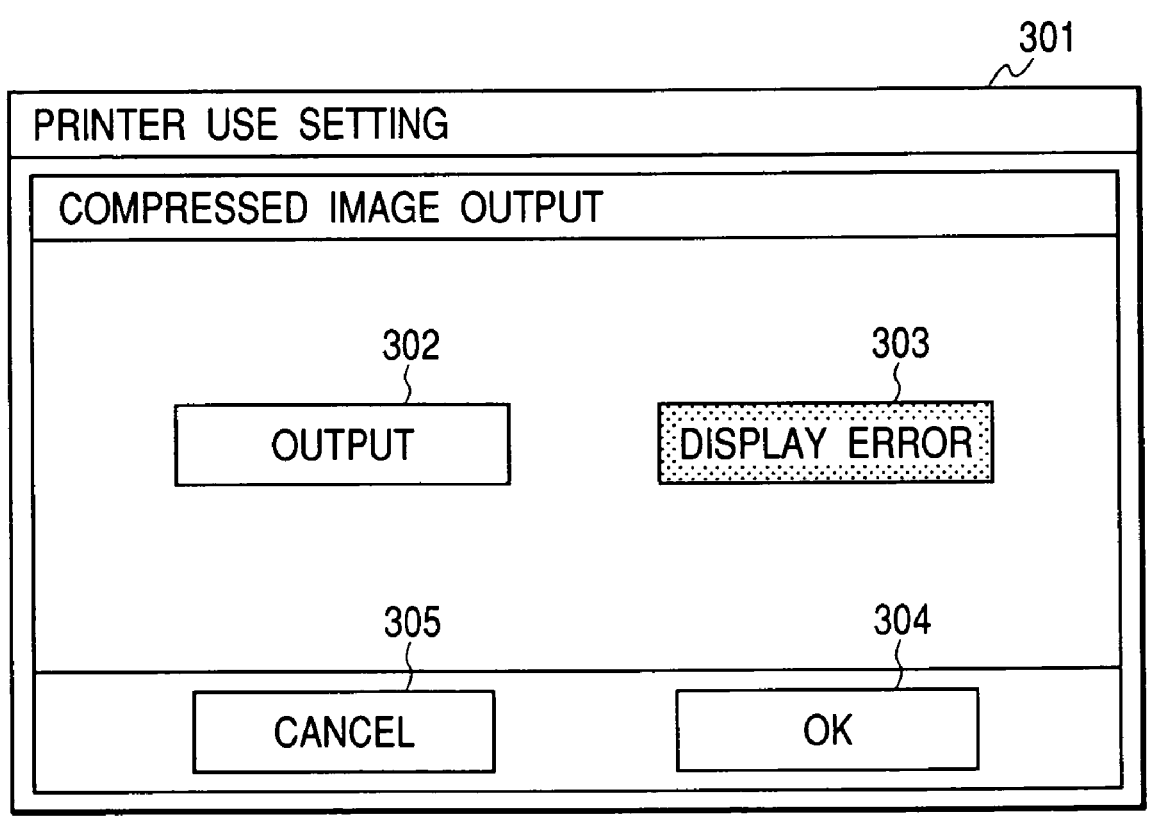
FIG. 3 is a diagram for explaining an example of a compression image output selecting display screen of a printer use setting which is displayed on a liquid crystal display panel unit of an operation unit shown in FIG. 2.

FIG. 3 is a diagram for explaining an example of a compression image output selecting display screen of a printer use setting which is displayed on a liquid crystal display panel unit of the operation panel 1012 shown in FIG. 2.

In FIG. 3, reference numeral 301 denotes a liquid crystal display panel (LCD) unit. The LCD unit 301 is a display screen which is displayed onto the LCD 301 provided for the operation panel 1012 when the user operates the operation panel 1012. Reference numeral 302 denotes a button for outputting and 303 indicates a button for displaying an error. The user can select either the button 302 or the button 303. Contents selected at present are displayed as a mesh region (in an example of FIG. 3, the button 303 for displaying the error has been selected).

If the output button 302 is selected, the image including the compression image using the Q table of the Q table ID6 is outputted. However, if error display button 303 is selected, the image including the compression image using the Q table of the Q table ID6 is not print-outputted but an error log of contents showing that the image using the Q table has been formed is displayed.

When the user selects the output button 302 and clicks an OK button 304, "6" is registered into a variable QMAX on the RAM 2. When the user selects the error display button 303 and clicks an OK button 304, "5" is registered into the variable QMAX.

When a cancel button 305 is selected, even if the output button 302 or the error display button 303 is selected and the previous contents are changed, the changed contents are not reflected to the variable QMAX.

The user interface (setting display screen) has been described above as an example. The user can make similar setting also from a printer driver program or a remote user interface program which is executed on the host computer. In this case, permission or inhibition of the print output of the compression image using the Q table ID6 is notified via the external network 3000 and the QMAX contents are updated.

Figure 4:
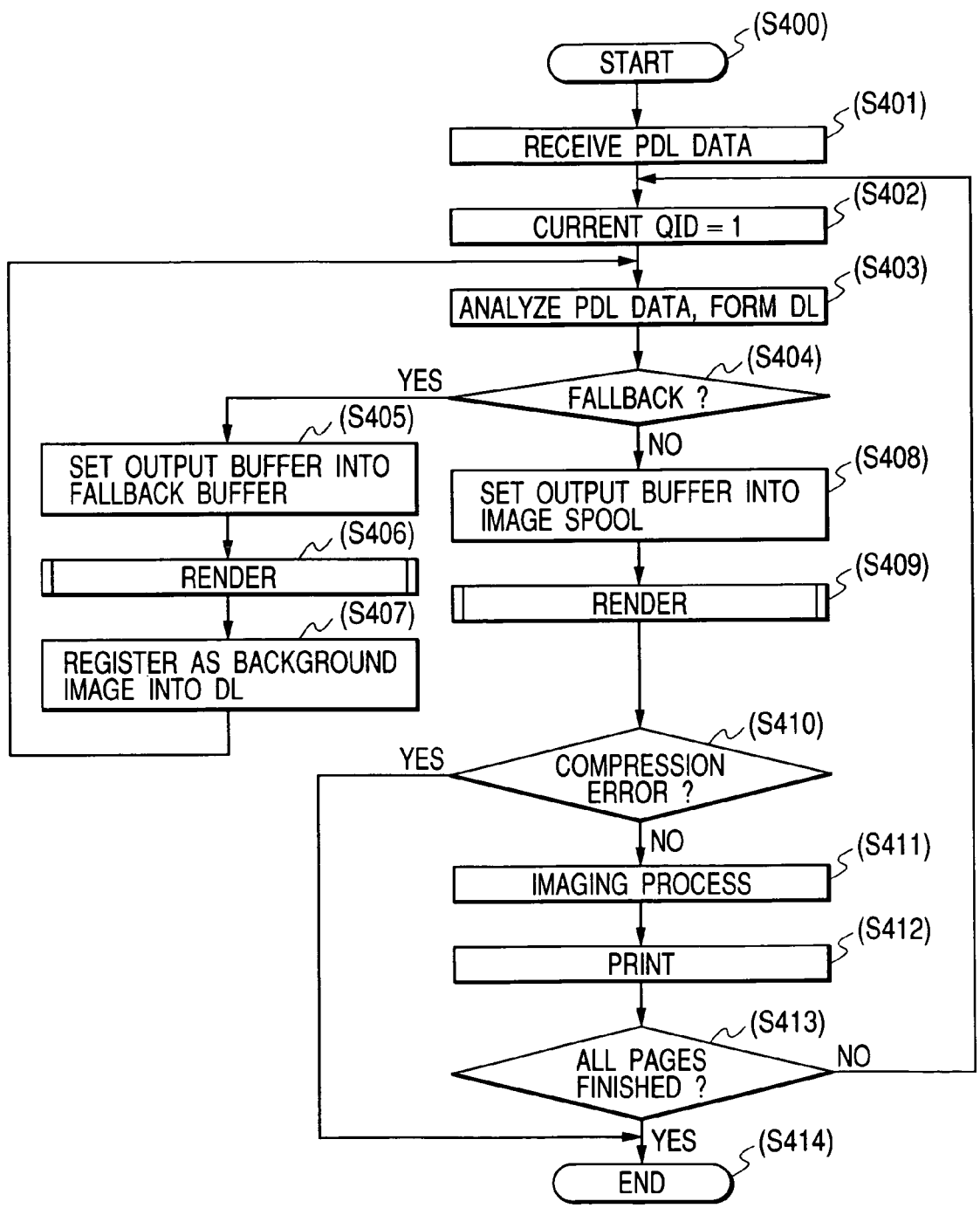
FIG. 4 is a flowchart showing an example of a first data processing procedure in the printing apparatus according to the invention.

FIG. 4 is a flowchart showing an example of a first data processing procedure in the printing apparatus according to the invention. This flowchart corresponds to a PDL job print processing procedure which is processed by the main-CPU 1 upon reception of a PDL job on the basis of the print control program which is stored in the ROM 4. S400 to S414 denote processing steps, respectively.

When the LBP 1000 receives the PDL job from the external network 3000 (S401), step S402 follows and a variable current QID showing a Q table ID which is being set at present is set to "1". Step S403 follows.

In step S403, the display list DL is generated (formed) on the RAM 2 while executing an analyzing process of the PDL data in the main-CPU 1. Step S404 follows. When the DL is formed in step S403, ordinarily, the DL of one page is formed. However, a size of local memory and a size of work table of the hard renderer 20 are checked all the time. If a size of DL which is being formed exceeds the size of local memory or if the size of work table which is used upon rendering of the DL which is being formed exceeds the size of table provided for the hard renderer 20, a fallback is caused and a fallback flag is set. At this point of time, the processing routine advances to step S404.

In step S404, the fallback flag is checked, thereby discriminating the presence or absence of the fallback. If it is determined that the fallback has been caused, step S405 follows.

In step S405, the image output buffer in which the compression image obtained after the rendering is stored is set to a fallback buffer and the processing routine advances to a rendering process in step S406.

In step S406, the DL generated in step S403 is rendered by using the hard renderer 20, a raster image is formed, and thereafter, a compression image is formed. Details of such a process will be explained hereinlater.

After the rendering process in step S406, step S407 follows. The compression image stored in the fallback buffer in step S406 is registered as a background image into the DL. The processing routine is returned to step S403 and the analysis of the PDL data and the generation of the DL are continued.

If it is determined in step S404 that the fallback is not caused, step S408 follows. The image output buffer in which the compression image obtained after the rendering is stored is set to an image spool in which an image for printing is stored. The processing routine advances to a rendering process in step S409.

The rendering process in step S409 is substantially the same as step S406 except that the compression image obtained after the rendering is stored into the image spool. After completion of the rendering process in step S409, step S410 follows. A variable compression error flag which is set during the rendering process in step S406 or S409 is checked, thereby discriminating the presence or absence of a compression error. If it is determined that the compression error exists, it is decided that image deterioration of a degree which is equal to or larger than that previously set by the user as allowance has been caused during the rendering, the printing process of the PDL job is interrupted there, and the processing routine is finished (S414).

If it is decided in step S410 that there is no compression error, step S411 follows. The compression image stored in the image spool in step S409 and the compressed attribute bit are transferred to the image processing unit 24 and a proper image process is executed in accordance with the attribute bit while decompressing the compression image into the raster image. Step S412 follows.

In step S412, the raster image which was image-processed in step S411 is transferred to the printing unit 9 and printed onto the paper. Step S413 follows. Whether the processes of all pages of the PDL job received in step S401 have been finished or not is discriminated. If the processes of all pages have been finished, the printing process of the PDL job is finished (S414). If it is determined that the PDL data to be processed still remains, the processing routine is returned to step S402. The current QID is initialized to "1". After that, the analysis of the PDL data and the DL generating process (DL forming process) are continued.

Figure 5:
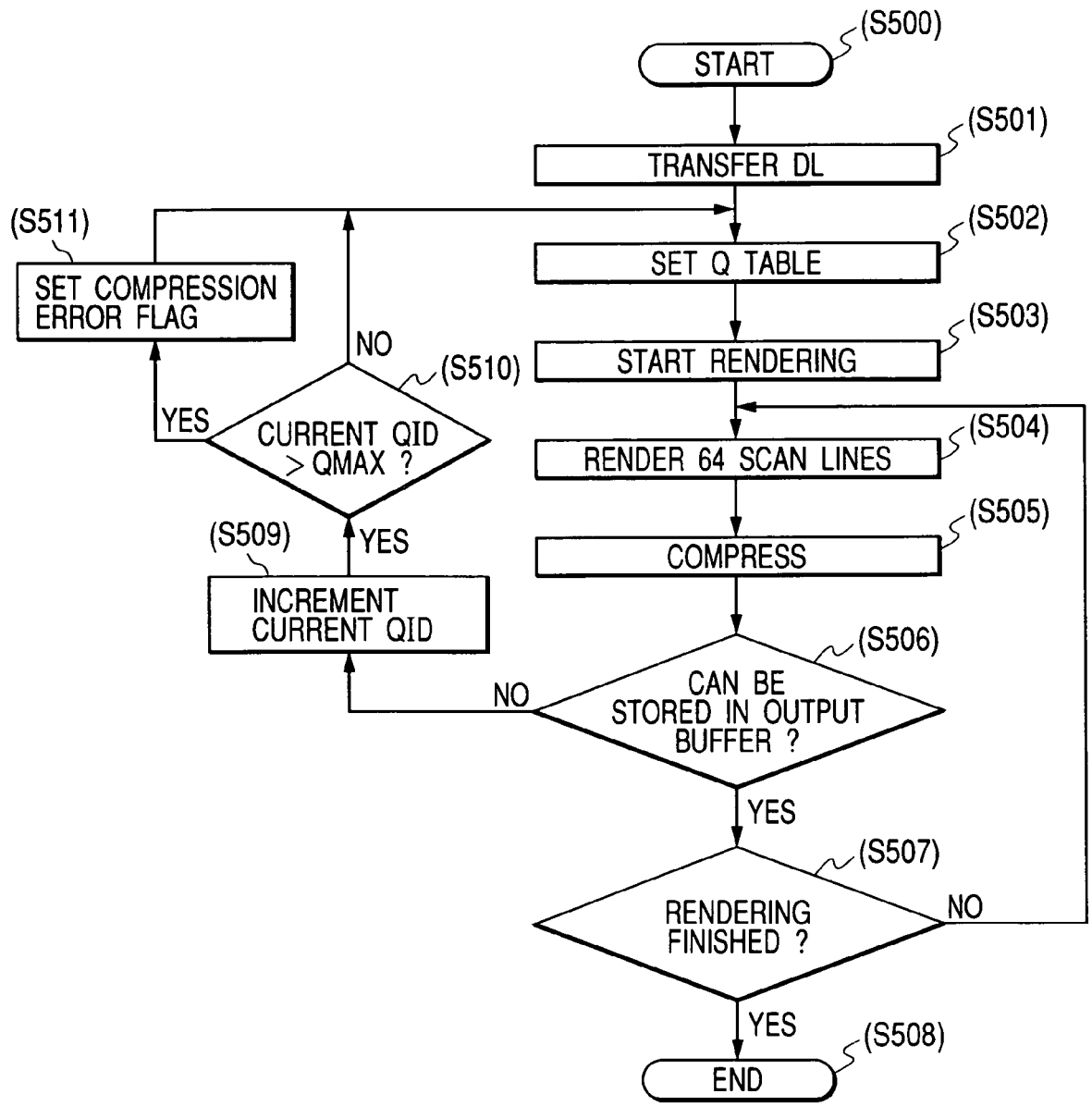
FIG. 5 is a flowchart showing an example of a second data processing procedure in the printing apparatus according to the invention.

FIG. 5 is a flowchart showing an example of a second data processing procedure in the printing apparatus according to the invention. This flowchart corresponds to a detailed procedure which is executed until the DL is rendered in steps S406 and S409 shown in FIG. 4 and the formed raster image is compressed and stored into the output buffer set in just previous step. S500 to S511 denote processing steps, respectively.

When step S406 or S409 shown in FIG. 4 mentioned above is executed, the processing routine is started (S500). The DL formed in the RAM 2 in step S402 is transferred to the local memory 21 on the hard renderer 20 (S501). Step S502 follows. The Q table of the Q table ID set in the variable current QID is set into the irreversible compressing unit 22.

In step S503, various initializing processes such as setting of a register of the hard renderer 20 and the like are executed, thereafter, a signal to start the rendering is sent, and the rendering of the DL on the local memory 21 is started.

In step S504, the hard renderer 20 forms a raster image of 64 scan lines and an attribute bit corresponding to the raster image into the buffer on the local memory while analyzing the DL on the local memory 21.

Although the raster image of 64 scan lines is been formed here, the number of scan lines is shown as an example and, naturally, it can be set to another number.

Subsequently, in step S505, the raster image formed in step S504 is transferred to the irreversible compressing unit 22, the JPEG compression is executed by the Q table set in step S502, and the formed compression image is stored into the image output buffer set in step S405 or S408.

Further, in step S505, the attribute bit formed in step S504 is transferred to the reversible compressing unit 23, the reversible compression is executed, and thereafter, the compressed attribute bit is stored into the image output buffer.

When the compression image and the compressed attribute bit are stored into the image output buffer in step S505, whether they can be stored into the image output buffer or not is always checked. Therefore, whether they could be enclosed into the image output buffer or not is discriminated in step S506. If it is determined that they could be enclosed into the image output buffer, step S507 follows. Further, by checking the number of rendered scan lines, whether the rendering of one page has been finished or not is discriminated. If it is determined that the rendering of one page has been finished, the rendering process is finished (S508). If it is determined that the rendering of one page is not finished, the processing routine is returned to step S504 and the residual rendering is continued.

If it is determined in step S506 that the compression image or the compressed attribute bit cannot be enclosed into the image output buffer, step S509 follows. The value of the variable current QID is incremented.

In step S510, the variable current QID and the variable QMAX set by the user setting are compared, thereby discriminating whether the value of the variable current QID is equal to or less than the value of the variable QMAX or not. If it is decided that the value of the variable current QID is equal to or less than the value of the variable QMAX, the processing routine is returned to step S502. The Q table of the Q table ID set in the variable current QID is reset to the irreversible compressing unit 22 and the rendering is restarted.

If it is decided in step S510 that the value of the variable current QID is larger than the value of the variable QMAX, the processing routine advances to step S511. A variable compression error flag is set. After that, the processing routine is returned to step S502.

According to the first embodiment as mentioned above, since the pages subsequent to the page including the image containing the compression image compressed by the Q table of the Q table ID which is larger than QMAX set by the designation of the user are not outputted and an error is outputted instead, the image of large image deterioration which is not desired by the user is not outputted.

(Second Embodiment)

In the first embodiment, if it is determined in step S410 shown in FIG. 4 that the compression error has occurred, step S414 follows and the process of the PDL is interrupted and the processing routine is finished. However, naturally, a similar effect can be obtained by clearing the compression error flag and advancing the processing routine to step S413.

According to the second embodiment, only the page including the image containing the compression image compressed by the Q table of the Q table ID larger than QMAX which is set by the designation of the user in the PDL job is not outputted.

(Third Embodiment)

Figure 6:
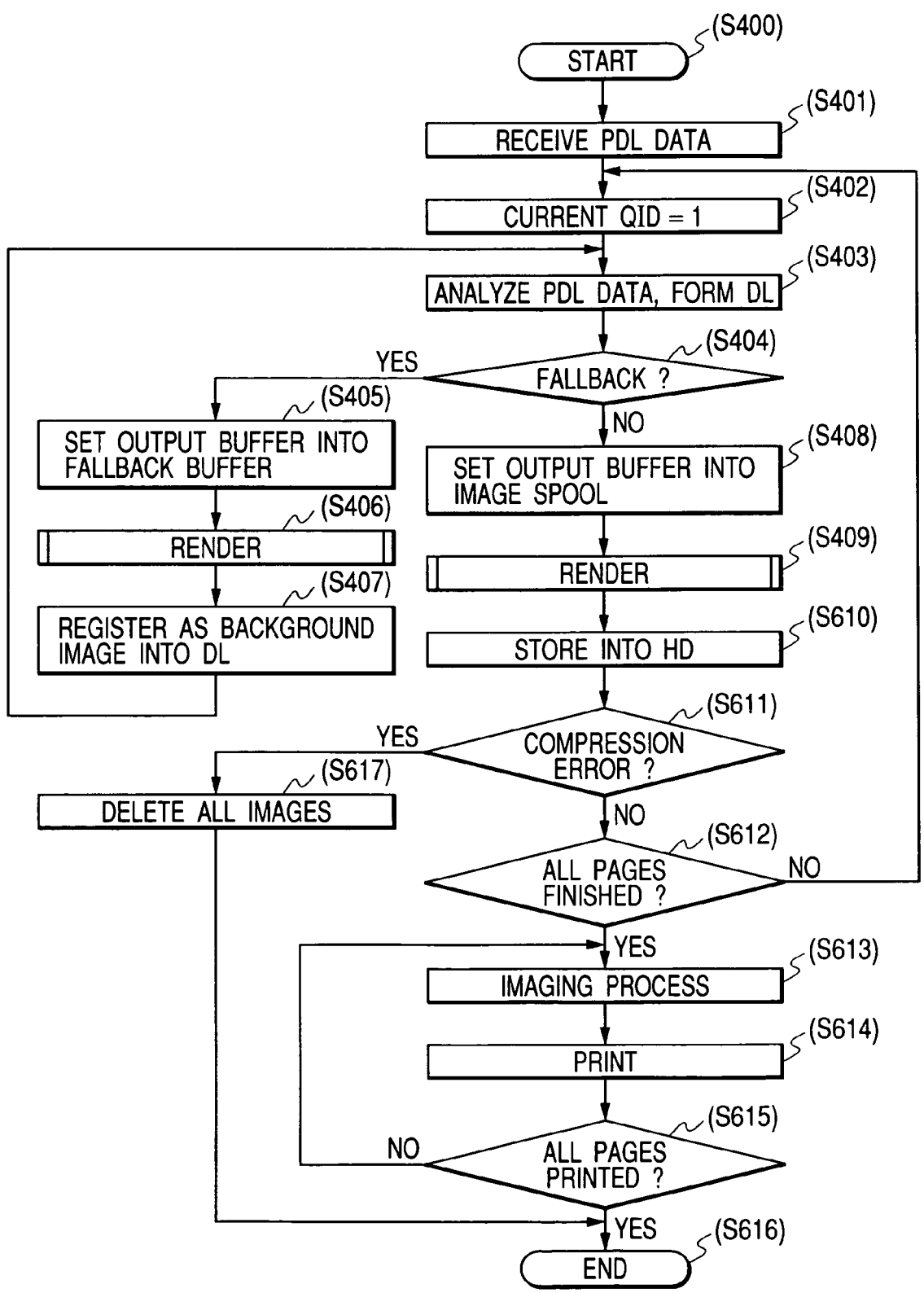
FIG. 6 is a flowchart showing an example of a third data processing procedure in the printing apparatus according to the invention.

FIG. 6 is a flowchart showing an example of a second data processing procedure in the printing apparatus according to the invention. This flowchart corresponds to a print processing procedure of the PDL job upon reception of the PDL job of the LBP 1000. The same processing steps in FIG. 4 are designated by the same step numbers. S610 to S616 denote processing steps, respectively. Further, since processes in steps S400 to S409 shown in FIG. 6 are similar to those in the first embodiment except that after completion of step S409, the processing routine advances to step S610, their description is omitted here.

In step S610, the compression image stored in the image spool and the compressed attribute bit are stored into the hard disk. In step S611, the compression error flag is checked, thereby discriminating whether the compression error has been caused or not. If it is decided that no compression error is caused, whether the processes of all pages of the PDL job received in step S402 have been finished or not is discriminated in step S612. If it is decided that the processes of all pages have been finished, step S613 follows. If the PDL data to be processed still remains, the processing routine is returned to step S403. The analysis of the PDL data and the DL generating process are continued.

In step S613, the compression image and the compressed attribute bit are read out page by page from the hard disk and transferred to the image processing unit 24 and a proper image process is executed while decompressing the compression image into the raster image in accordance with the attribute bit.

In step S614, the raster image which was image-processed in step S613 is transferred to the printing unit 9 and printed onto the paper.

Subsequently, in step S615, whether the compression images of all pages stored in the hard disk have been printed or not is discriminated. If it is determined that the printing of all pages is not finished yet, the processing routine is returned to step S613 and the image process and printing process of the next page are continued.

If it is determined in step S615 that the printing process of all pages have been finished, the printing process of the PDL job is finished (S616).

If it is determined in step S611 that the compression error has been caused, step S617 follows. All compression images and compressed attribute bits stored in the hard disk in step s610 are deleted and the printing process of the PDL job is finished (S616).

According to the third embodiment as mentioned above, since the PDL job including the image containing the compression image compressed by the Q table of the Q table ID larger than QMAX which is set by the designation of the user is not outputted but an error is outputted, the image of large image deterioration which is not desired by the user is not outputted.

(Fourth Embodiment)

Figure 7:
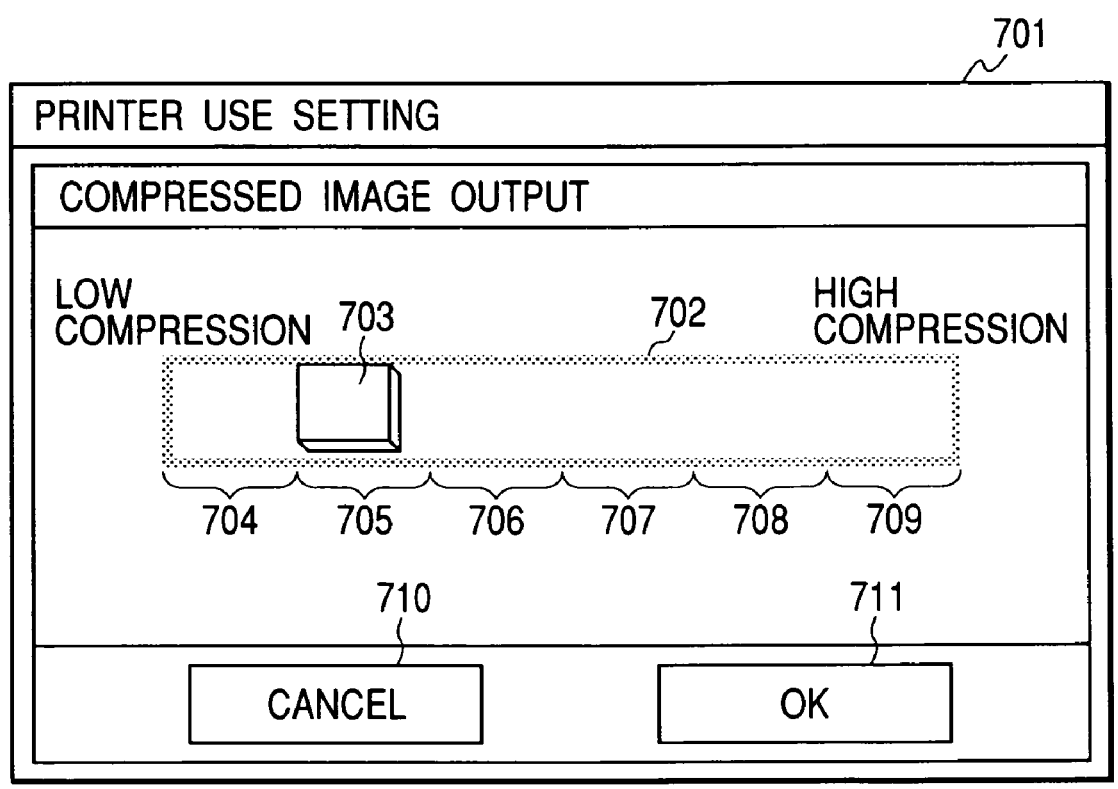
FIG. 7 is a diagram showing an example of a compression image output selecting display screen of a printer use setting in a printing apparatus showing the fourth embodiment of the invention.

FIG. 7 is a diagram showing an example of a compression image output selecting display screen in a printer use setting in a printing apparatus showing the fourth embodiment of the invention. Although the display screen 301 shown in FIG. 3 is displayed on the operation unit 1012 in the first to third embodiments, according to the fourth embodiment, in place of it, a display screen 701 shown in FIG. 7 is displayed on the operation unit 1012 and the user selects step by step the degree of the image deterioration of the image which is print-outputted by operating the operation panel 1012 on the display screen.

Reference numeral 703 denotes a slider. The user can freely move the slider 703 in a slider operating area 702 by operating the operation panel 1012. A value which is registered into the variable QMAX is selected on the basis of a position of the slider 703 in the slider operating area 702.

When a center position of the slider 703 lies within a range 704, "1" is registered into the variable QMAX by clicking an OK button 711. When the center position of the slider 703 lies within a range 705, "2" is registered into the variable QMAX by clicking the OK button 711. When the center position of the slider 703 lies within a range 706, "3" is registered into the variable QMAX by clicking the OK button 711. When the center position of the slider 703 lies within a range 707, "4" is registered into the variable QMAX by clicking the OK button 711. When the center position of the slider 703 lies within a range 708, "5" is registered into the variable QMAX by clicking the OK button 711. When the center position of the slider 703 lies within a range 709, "6" is registered into the variable QMAX by clicking the OK button 711. Reference numeral 710 denotes a cancel button.

According to the fourth embodiment as mentioned above, the user can select an arbitrary degree of the image deterioration of the image which is not outputted and the usability can be improved more.

A construction of data processing programs which can be read out by the printing apparatus according to the invention will be described with reference to a memory map shown in FIG. 8.

FIG. 8 is a diagram for explaining the memory map of a storing medium for storing various data processing programs which can be read out by the printing apparatus according to the invention.

Although not shown in particular, information to manage a program group which is stored in the storing medium, for example, version information, an implementor, and the like are also stored. There is also a case where information depending on an OS or the like on the program reading side, for example, icons to identify and display the program or the like are stored.

Further, the data which depends on the various programs is also managed on the directory. There is also a case where a program for installing various programs into a computer and, if the installing program has been compressed, a program for decompressing it or the like are also stored.

The functions shown in FIGS. 4 to 6 in the embodiment can be also executed by the host computer in accordance with a program which is installed from an outside. In this case, the invention is applied to a case where an information group including the program is supplied to an output apparatus from a storing medium such as CD-ROM, flash memory, FD, or the like or from an external storing medium via the network.

As mentioned above, naturally, the object of the invention is accomplished by a method whereby a storing medium in which program codes of software to realize the functions of the embodiments mentioned above have been recorded is supplied to a system or an apparatus and a computer (or a CPU or an MPU) of the system or apparatus reads out the program codes stored in the storing medium and executes them.

In this case, the program codes themselves read out from the storing medium realize the novel functions of the invention and the storing medium in which the program codes have been stored constructs the invention.

As a storing medium for supplying the program codes, for example, a flexible disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes.

Further, naturally, the invention also incorporates a case where the program codes read out from the storing medium are written into a memory provided for a function expanding board inserted into a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

The invention is not limited to the foregoing embodiments but many variations and modifications (containing an organic combination of the embodiments) are possible on the basis of the spirit of the invention and they are not excluded from the purview of the invention.

Although various examples and embodiments of the invention have been shown and described above, it would obviously been understood by a person with ordinary skill in the art but the following embodiments are incorporated. The embodiments 1 to 11 will now be described hereinbelow.

(Embodiment 1)

A printing apparatus for compressing raster image information which is formed in accordance with print information which is inputted and holding it into an image output buffer on an internal memory, comprising: image deterioration threshold value designating means for designating a threshold value for discriminating a deterioration state of the raster image information upon compression (for example, it is designated by a compression image output selecting display screen shown in FIG. 3); and image deterioration discriminating means (for example, step S510 in FIG. 5) for discriminating whether the image deterioration state of the compressed raster image information exceeds the threshold value designated by the image deterioration threshold value designating means or not.

(Embodiment 2)

A printing apparatus according to Embodiment 1, further comprising means (step S410 shown in FIG. 4) for not outputting a page containing the compression image of the raster image which is formed in the printing apparatus if the image deterioration discriminating means determines that the image deterioration state exceeds the image deterioration designated by the image deterioration threshold value designating means.

(Embodiment 3)

A printing apparatus according to Embodiment 1, further comprising means (step S410 shown in FIG. 4) for not outputting a print job including a page containing the compression image of the raster image which is formed in the printing apparatus if the image deterioration discriminating means determines that the image deterioration state exceeds the image deterioration designated by the image deterioration threshold value designating means.

(Embodiment 4)

A printing apparatus according to any one of Embodiments 1 to 3, wherein the image deterioration threshold value designating means can variably designate a level of the threshold value for discriminating the deterioration state of the raster image information upon compression (for example, it is designated by the compression image output selecting display screen shown in FIG. 7).

(Embodiment 5)

A printing apparatus for compressing raster image information which is formed in accordance with print information which is inputted from an information processing apparatus and holding it into an internal memory, comprising: receiving means for receiving a threshold value for discriminating a deterioration state of the raster image information upon compression from the information processing apparatus; and image deterioration discriminating means (for example, step S510 in FIG. 5) for discriminating whether the image deterioration state of the compressed raster image information exceeds the threshold value received by the receiving means or not.

(Embodiment 6)

An information processing apparatus which can communicate with a printing apparatus via a printer driver, wherein the printing apparatus has designating means for designating a threshold value for discriminating a deterioration state of image information upon compression of raster image information which is formed in accordance with print information.

(Embodiment 7)

A control method of a printing apparatus for compressing raster image information which is formed in accordance with print information which is inputted and holding it into an internal memory, comprising: an image deterioration threshold value designating step of designating a threshold value for discriminating a deterioration state of the raster image information upon compression; and an image deterioration discriminating step (for example, step S510 in FIG. 5) of discriminating whether the image deterioration state of the compressed raster image information exceeds the threshold value designated by the image deterioration threshold value designating step or not.

(Embodiment 8)

A control method of the printing apparatus according to Embodiment 7, further comprising a control step (for example, step S410 shown in FIG. 4) of not outputting a page containing the compression image of the raster image which is formed in the printing apparatus if the image deterioration discriminating step determines that the image deterioration state exceeds the image deterioration designated by the image deterioration threshold value designating step.

(Embodiment 9)

A control method of the printing apparatus according to Embodiment 7, further comprising a control step (for example, step S410 shown in FIG. 4) of not outputting a print job including a page containing the compression image of the raster image which is formed in the printing apparatus if the image deterioration discriminating step determines that the image deterioration state exceeds the image deterioration designated by the image deterioration threshold value designating step.

(Embodiment 10)

A computer-readable storing medium which stores a program for realizing a control method of the printing apparatus according to any one of Embodiments 7 to 9.

(Embodiment 11)

A program for realizing a control method of the printing apparatus according to any one of Embodiments 7 to 9.

As described above, according to the Embodiments of the invention, in the printing apparatus for compressing the raster image information which is formed in accordance with the print information which is inputted and holding it into the internal memory, the threshold value for discriminating the deterioration state of the raster image information upon compression is designated and whether the image deterioration state of the compressed raster image information exceeds the designated threshold value or not is discriminated, thereby enabling the user to select whether the print output including the compression image of the large image deterioration as mentioned above is printed or not, so that an effect such that the print output which is not desired by the user is not outputted and the usability can be improved can be obtained.

What is claimed is:

1. A print control apparatus comprising:
   a discrimination unit adapted for discriminating, in receiving print data and generating a display list, whether a size of the display list exceeds a size of a work memory;
   a registration unit adapted for generating an image based on the display list which is being generated, compressing the generated image such that the compressed image is contained in a buffer, and registering the compressed image as a background image in the display list, if said discrimination unit discriminates that the size of the display list exceeds the size of the work memory;
   a rendering unit adapted for generating an image based on the display list which is being generated, and compressing the generated image in accordance with a designated image compression ratio such that the compressed image is contained in the buffer, if said discrimination unit discriminates that the size of the display list does not exceed the size of the work memory; and
   a print unit adapted for printing an image obtained by decompressing the image compressed by said rendering unit in accordance with a set compression ratio.

2. An apparatus according to claim 1, further comprising a changing unit adapted for changing the set compression ratio.

3. An apparatus according to claim 1, wherein said print unit does not print the image obtained by decompressing the image compressed by said rendering unit if the designated image compression ratio exceeds the set compression ratio.

4. An apparatus according to claim 1, wherein said registration unit compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

5. An apparatus according to claim 1, wherein the compression ratio includes QID in JPEG.

6. A print control method comprising:
   a discrimination step of discriminating, in receiving print data and generating a display list, whether a size of the display list exceeds a size of a work memory;
   a registration step of generating an image based on the display list which is being generated, compressing the generated image such that the compressed image is contained in a buffer, and registering the compressed image as a background image in the display list, if said discrimination step discriminates that the size of the display list exceeds the size of the work memory;
   a rendering step of generating an image based on the display list which is being generated, and compressing the generated image in accordance with a designated image compression ratio such that the compressed image is contained in the buffer, if said discrimination step discriminates that the size of the display list does not exceed the size of the work memory; and
   a print step of printing an image obtained by decompressing the image compressed in said rendering step in accordance with a set compression ratio.

7. A method according to claim 6, further comprising a changing step of changing the set compression ratio.

8. A method according to claim 6, wherein said print step does not print the image obtained by decompressing the image compressed in said rendering step if the designated image compression ratio exceeds the set compression ratio.

9. A method according to claim 6, wherein said registration step compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

10. A method according to claim 6, wherein the compression ratio includes QID in JPEG.

11. A computer-readable storage medium storing a computer-executable program for a print control method comprising:
    a discrimination step of discriminating, in receiving print data and generating a display list, whether a size of the display list exceeds a size of a work memory;
    a registration step of generating an image based on the display list which is being generated, compressing the generated image such that the compressed image is contained in a buffer, and registering the compressed image as a background image in the display list, if said discrimination step discriminates that the size of the display list exceeds the size of the work memory;
    a rendering step of generating an image based on the display list which is being generated, and compressing the generated image in accordance with a designated image compression ratio such that the compressed image is contained in the buffer, if said discrimination step discriminates that the size of the display list does not exceed the size of the work memory; and
    a print step of printing an image obtained by decompressing the image compressed in said rendering step in accordance with a set compression ratio.

12. A computer-readable storage medium according to claim 11, wherein the method further comprises a changing step of changing the set compression ratio.

13. A computer-readable storage medium according to claim 11, wherein said print step does not print the image obtained by decompressing the image compressed in said rendering step if the designated image compression ratio exceeds the set compression ratio.

14. A computer-readable storage medium according to claim 11, wherein said registration step compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

15. A computer-readable storage medium according to claim 11, wherein the compression ratio includes QID in JPEG.

16. A print control apparatus comprising:
    a discrimination unit adapted for discriminating, in receiving print data and generating a display list, whether a size of the display list exceeds a size of a work memory;
    a registration unit adapted for generating an image based on the display list, compressing the generated image in accordance with a set image compression ratio such that the compressed image is contained in a buffer, and registering the compressed image as a background image in the display list, if said discrimination unit discriminates that the size of the display list exceeds the size of the work memory, wherein if the compressed image is not contained in the buffer, said registration unit changes the set image compression ratio and compresses the generated image in accordance with the changed image compression ratio such that the compressed image is contained in the buffer, and registers the compressed image as a background image in the display list;

a rendering unit adapted for generating an image based on the display list, and compressing the generated image in accordance with a set image compression ratio such that the compressed image is contained in the buffer, if said discrimination unit discriminates that the size of the display list does not exceed the size of the work memory, wherein if the compressed image is not contained in the buffer, said rendering unit changes the set image compression ratio and compresses the generated image in accordance with the changed image compression ratio such that the compressed image is contained in the buffer; and a print unit adapted for printing an image obtained by decompressing the image compressed by said rendering unit, if the changed image compression ratio does not exceed a designated compression ratio, wherein said print unit does not print the image obtained by decompressing the image compressed by said rendering unit, if the changed image compression ratio exceeds the designated compression ratio.

17. An apparatus according to claim 16, further comprising a changing unit adapted for changing the designated compression ratio.

18. An apparatus according to claim 16, wherein said registration unit sets a compression error flag if the changed image compression ratio exceeds the designated compression ratio, wherein said rendering unit sets a compression error flag, if the changed image compression ratio exceeds the designated compression ratio, and wherein said print unit prints the image obtained by decompressing the image compressed by said rendering unit if the error flag is set, and does not print the image obtained by decompressing the image compressed by said rendering unit if the error flag is not set.

19. A print control apparatus comprising:
a setting unit adapted for setting an image compression ratio;
a discrimination unit adapted for discriminating, in receiving print data and generating a display list, whether a size of the display list exceeds a size of a work memory;
a registration unit adapted for generating an image based on the display list which is being generated, compressing the generated image such that the compressed image is contained in a buffer, and registering the compressed image as a background image in the display list, if said discrimination unit discriminates that the size of the display list exceeds the size of the work memory;
a rendering unit adapted for generating an image based on the display list which is being generated, and compressing the generated image such that the compressed image is contained in the buffer, if said discrimination unit discriminates that the size of the display list does not exceed the size of the work memory; and
a print unit adapted for printing an image obtained by decompressing the image compressed by said rendering unit in accordance with the image compression ratio set by said setting unit.

20. An apparatus according to claim 19, wherein said setting unit comprises an operation panel.

21. An apparatus according to claim 19, wherein said print unit does not print the image obtained by decompressing the image compressed by said rendering unit if the image compression ratio set by said setting unit exceeds the set compression ratio.

22. An apparatus according to claim 19, wherein said registration unit compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

23. An apparatus according to claim 19, wherein the compression ratio includes QID in JPEG.

24. A print control method comprising:
a discrimination step of discriminating, in receiving print data and generating a display list, whether a size of the display list exceeds a size of a work memory;
a registering step of generating an image based on the display list, compressing the generated image in accordance with a set image compression ratio such that the compressed image is contained in a buffer, and registering the compressed image as a background image in the display list, if said discrimination step discriminates that the size of the display list exceeds the size of the work memory, wherein if the compressed image is not contained in the buffer, said registering step changes the set image compression ratio and compresses the generated image in accordance with the changed image compression ratio such that the compressed image is contained in the buffer, and registers the compressed image as a background image in the display list;
a rendering step of generating an image based on the display list, and compressing the generated image in accordance with a set image compression ratio such that the compressed image is contained in the buffer, if said discrimination step discriminates that the size of the display list does not exceed the size of the work memory, wherein if the compressed image is not contained in the buffer, said rendering step changes the set image compression ratio and compresses the generated image in accordance with the changed image compression ratio such that the compressed image is contained in the buffer; and
a printing step of printing an image obtained by decompressing the image compressed by said rendering step, if the changed image compression ratio does not exceed a designated compression ratio, wherein said printing step does not print the image obtained by decompressing the image compressed in said rendering step, if the changed image compression ratio exceeds the designated compression ratio.

25. A method according to claim 24, further comprising a changing step of changing the designated compression ratio.

26. A method according to claim 24, wherein said registering step sets a compression error flag if the changed image compression ratio exceeds the designated compression ratio, wherein said rendering step sets a compression error flag, if the changed image compression ratio exceeds the designated compression ratio, and wherein said printing step prints the image obtained by decompressing the image compressed in said rendering step if the error flag is set, and does not print the image obtained by decompressing the image compressed in said rendering step if the error flag is not set.

27. A print control method comprising:
- a setting step of setting an image compression ratio;
- a discrimination step of discriminating, in receiving print data and generating a display list, whether a size of the display list exceeds a size of a work memory;
- a registering step of generating an image based on the display list which is being generated, compressing the generated image such that the compressed image is contained in a buffer, and registering the compressed image as a background image in the display list, if said discrimination step discriminates that the size of the display list exceeds the size of the work memory;
- a rendering step of generating an image based on the display list which is being generated, and compressing the generated image such that the compressed image is contained in the buffer, if said discrimination step discriminates that the size of the display list does not exceed the size of the work memory; and
- a printing step of printing an image obtained by decompressing the image compressed in said rendering step in accordance with the image compression ratio set in said setting step.

28. A method according to claim 27, wherein said printing step does not print the image obtained by decompressing the image compressed in said rendering step if the image compression ratio set in said setting step exceeds the set compression ratio.

29. A method according to claim 27, wherein said registering step compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

30. A method according to claim 27, wherein the compression ratio includes QID in JPEG.

31. A computer-readable storage medium storing a computer-executable program, the computer-executable program comprising:
- a discrimination step of discriminating, in receiving print data and generating a display list, whether a size of the display list exceeds a size of a work memory;
- a registering step of generating an image based on the display list, compressing the generated image in accordance with a set image compression ratio such that the compressed image is contained in a buffer, and registering the compressed image as a background image in the display list, if said discrimination step discriminates that the size of the display list exceeds the size of the work memory, wherein if the compressed image is not contained in the buffer, said registering step changes the set image compression ratio and compresses the generated image in accordance with the changed image compression ratio such that the compressed image is contained in the buffer, and registers the compressed image as a background image in the display list;
- a rendering step of generating an image based on the display list, and compressing the generated image in accordance with a set image compression ratio such that the compressed image is contained in the buffer, if said discrimination step discriminates that the size of the display list does not exceed the size of the work memory, wherein if the compressed image is not contained in the buffer, said rendering step changes the set image compression ratio and compresses the generated image in accordance with the changed image compression ratio such that the compressed image is contained in the buffer; and
- a printing step of printing an image obtained by decompressing the image compressed in said rendering step, if the changed image compression ratio does not exceed a designated compression ratio, wherein said printing step does not print the image obtained by decompressing the image compressed in said rendering step, if the changed image compression ratio exceeds the designated compression ratio.

32. A computer-executable program according to claim 31, further comprising a changing step of changing the designated compression ratio.

33. A computer-executable program according to claim 31, wherein said registering step sets a compression error flag if the changed image compression ratio exceeds the designated compression ratio, wherein said rendering step sets a compression error flag, if the changed image compression ratio exceeds the designated compression ratio, and wherein said printing step prints the image obtained by decompressing the image compressed in said rendering step if the error flag is set, and does not print the image obtained by decompressing the image compressed in said rendering step if the error flag is not set.

34. A computer-readable storage medium storing a computer-executable program, the computer-executable program comprising:
- a setting step of setting an image compression ratio;
- a discrimination step of discriminating, in receiving print data and generating a display list, whether a size of the display list exceeds a size of a work memory;
- a registering step of generating an image based on the display list which is being generated, compressing the generated image such that the compressed image is contained in a buffer, and registering the compressed image as a background image in the display list, if said discrimination step discriminates that the size of the display list exceeds the size of the work memory;
- a rendering step of generating an image based on the display list which is being generated, and compressing the generated image such that the compressed image is contained in the buffer, if said discrimination step discriminates that the size of the display list does not exceed the size of the work memory; and
- a printing step of printing an image obtained by decompressing the image compressed in said rendering step in accordance with the image compression ratio set in said setting step.

35. A computer-executable program according to claim 34, wherein said printing step does not print the image obtained by decompressing the image compressed in said rendering step if the image compression ratio set in said setting step exceeds the set compression ratio.

36. A computer-executable program according to claim 34, wherein said registering step compresses the generated image, discriminates whether the compressed image is contained in the buffer, and if it is discriminated that the compressed image is not contained in the buffer, changes the image compression ratio and compresses the generated image in accordance with the changed compression ratio such that the compressed image is contained in the buffer.

37. A computer-executable program according to claim 34, wherein the compression ratio includes QID in JPEG.

* * * * *